March 18, 1941. H. HOPKES ET AL 2,235,554
SPRING CONSTRUCTION
Filed March 26, 1937 4 Sheets-Sheet 1
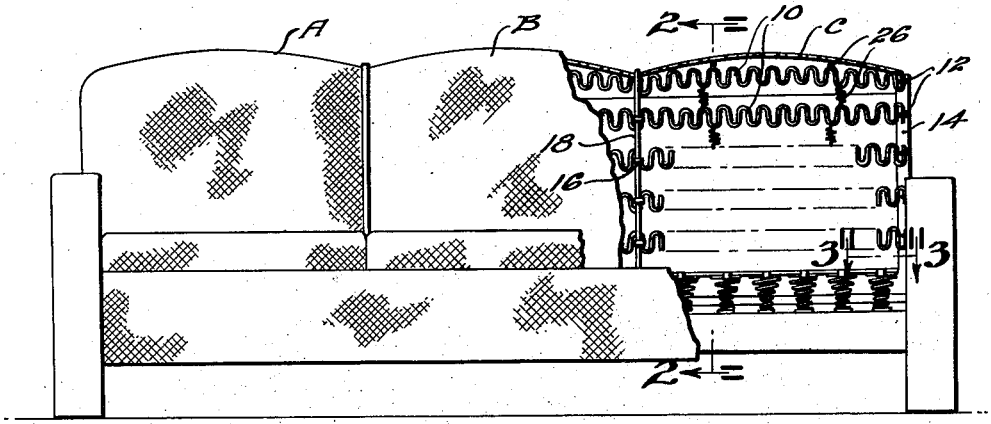
FIG. 1.
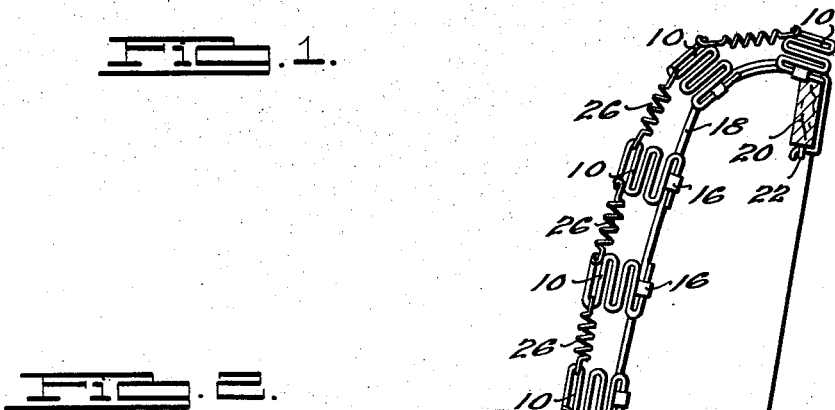
FIG. 2.
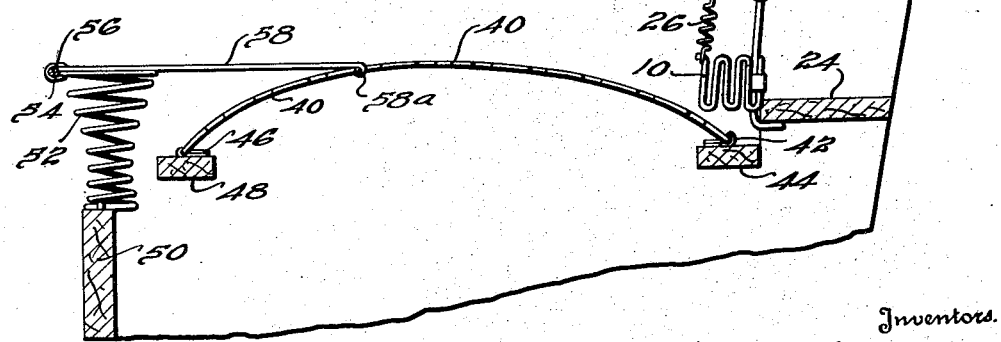
Inventors.
Henry Hopkes,
Andrew Mouw.
By Barnes, Dickey & Pierce.
Attorneys March 18, 1941.  H. HOPKES ET AL  2,235,554
SPRING CONSTRUCTION
Filed March 26, 1937  4 Sheets-Sheet 2
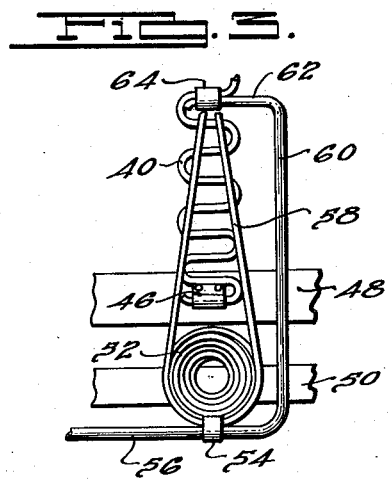
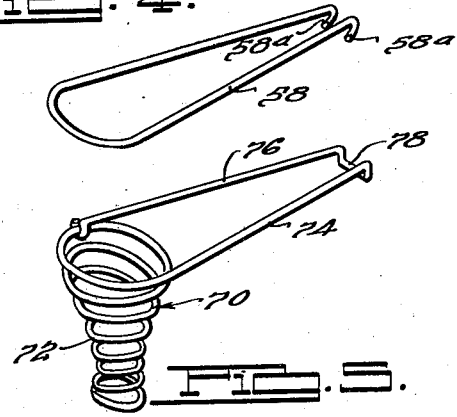
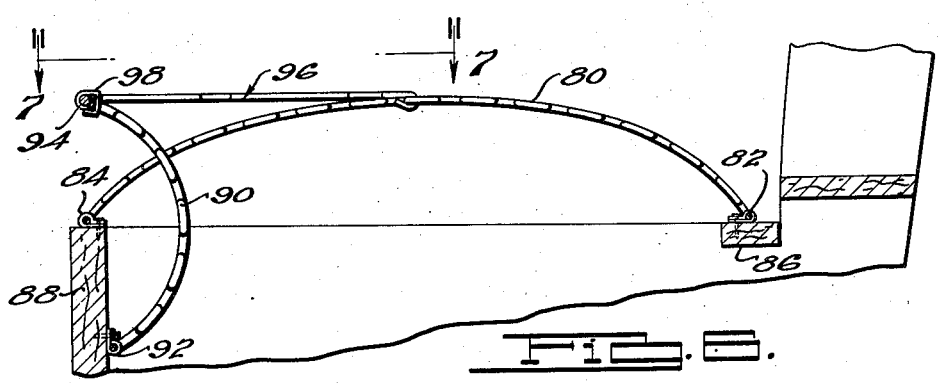
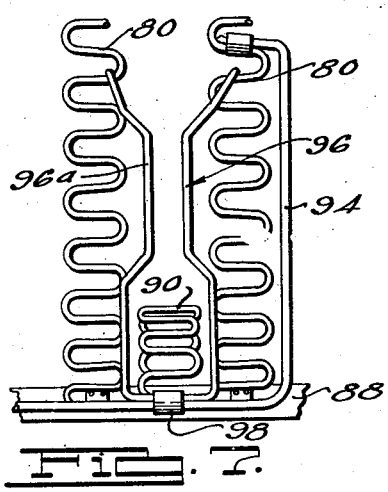
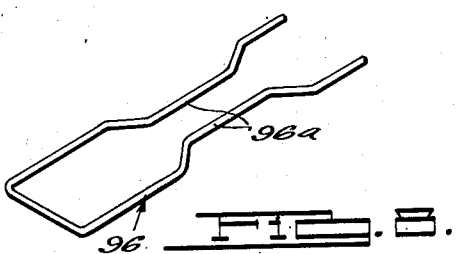
Inventors
Henry Hopkes,
Andrew Mouw.
By Harness, Dickey & Pierce.
Attorneys.

March 18, 1941.　　H. HOPKES ET AL　　2,235,554
SPRING CONSTRUCTION
Filed March 26, 1937　　4 Sheets-Sheet 3
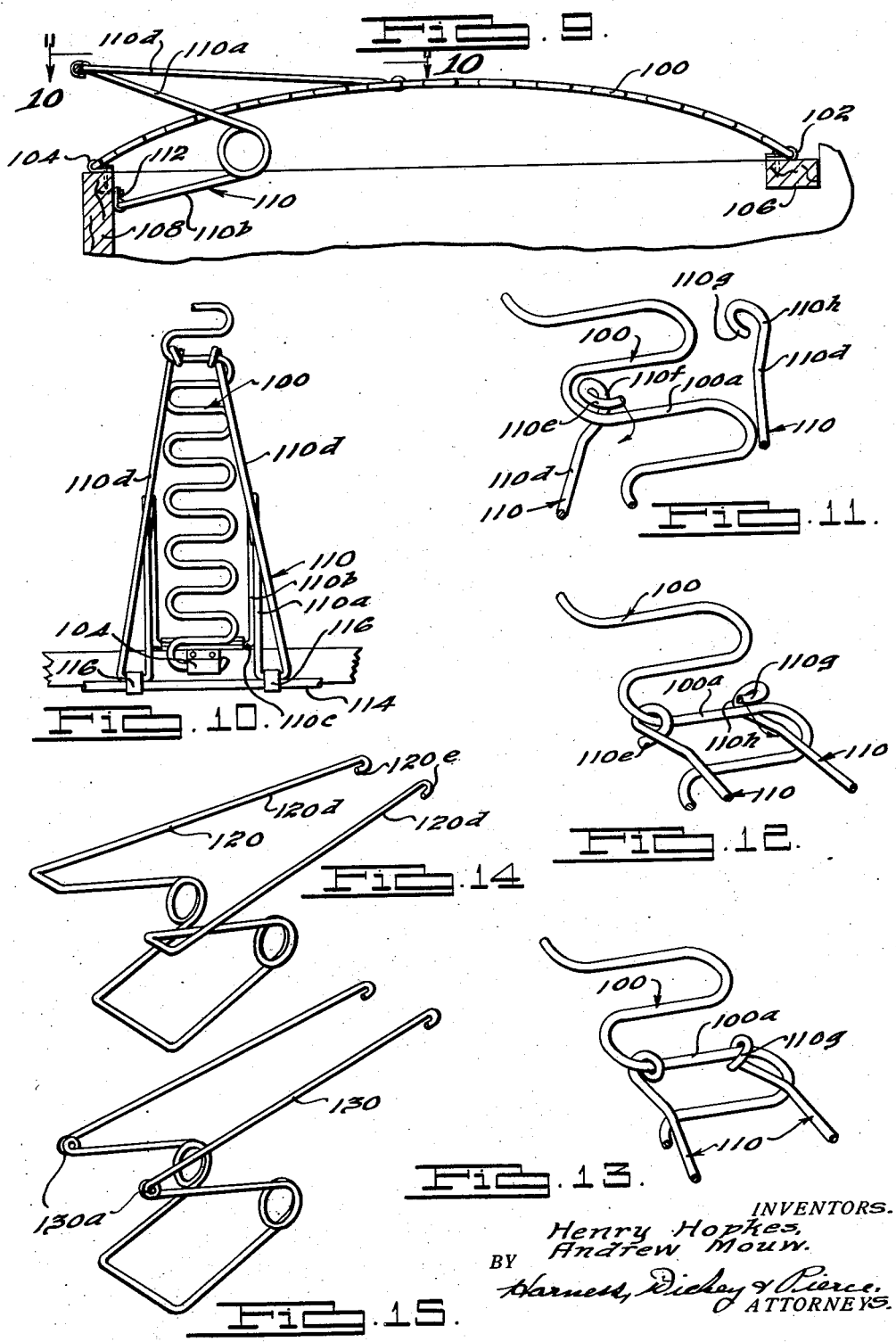
INVENTORS.
Henry Hopkes,
Andrew Mouw.
BY Harness, Dickey & Pierce
ATTORNEYS.

March 18, 1941.   H. HOPKES ET AL   2,235,554
SPRING CONSTRUCTION
Filed March 26, 1937   4 Sheets-Sheet 4
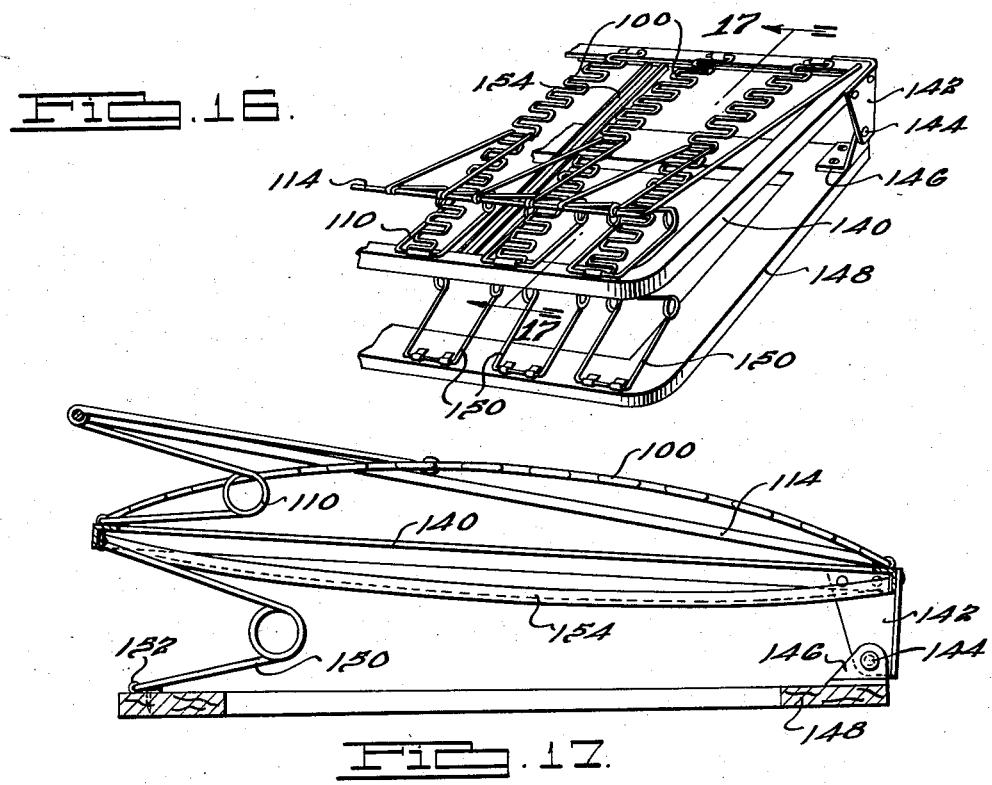
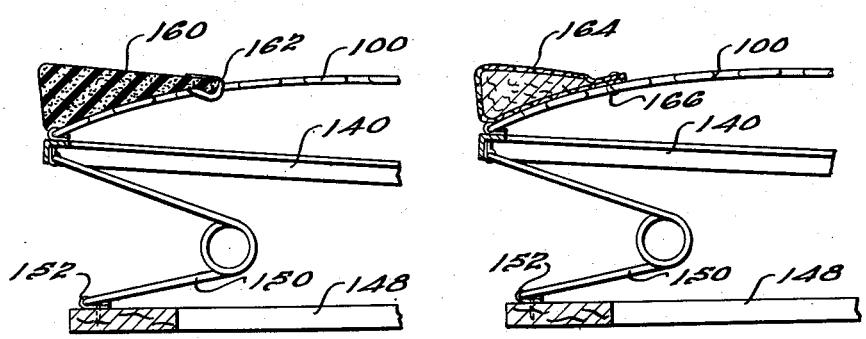
INVENTORS.
Henry Hopkes,
Andrew Mouw.
BY Harness, Dickey & Pierce
ATTORNEYS.

Patented Mar. 18, 1941

2,235,554

UNITED STATES PATENT OFFICE 2,235,554

SPRING CONSTRUCTION

Henry Hopkes, Grosse Pointe, and Andrew Mouw, Ann Arbor, Mich., assignors to No-Sag Spring Company, Detroit, Mich., a corporation of Michigan Application March 26, 1937, Serial No. 133,112

7 Claims. (Cl. 155—179)

The present invention relates to spring constructions for seats, backs, chairs, davenports, mattresses and the like, and particularly to such spring constructions utilizing spring elements so formed, arranged and interconnected as to provide a soft edge construction, and to permit the construction of relatively long spring bodies utilizing relatively short lengths of sinuous spring elements extending in the direction of the length of the bodies.

The Kaden Patent No. 2,002,399, issued May 21, 1935, under which the assignee of the present application is a licensee, discloses and claims a spring construction of the sinuous type, consisting of wires bent in zig-zag form and provided with a permanent set on an arc smaller than the arc upon which the wires are employed. When such a spring has both of its ends secured to a frame, ample support for the weight of the occupant is provided thereby, but such construction lacks the soft edge which provides additional support at the extreme edge of the seat.

The co-pending application of the present applicants, Serial No. 133,111, filed March 26, 1937, and assigned to the assignee of the present application, discloses and claims improved spring constructions utilizing spring elements of the Kaden type, particularly adapted to provide a soft edge seat construction, and in certain of its aspects, the spring construction of the present application is an improvement over the disclosure of this co-pending application.

In accordance with the present invention, a spring seat, for example, may be constructed of a plurality of parallel sinuous spring elements extending between the front and rear edges of the frame structure, and having associated therewith additional spring elements which project above the level of the sinuous elements at either the front or rear edges or both of the construction to provide a soft edge at either the front or the rear or both. The supplemental spring elements may alternatively take the form of additional reversely bent sinuous elements, coil springs, or jack springs.

In further accordance with the present invention, a seat may be constructed to have the upper and lower frame portions resiliently connected together, the upper frame portion in turn being provided with a spring surface which may incorporate the features discussed above. Preferably and as illustrated, the rear of the upper frame portion is pivotally connected to the lower frame portion, and the front edge is connected to the lower frame portion by spring elements.

In many instances, it is desirable in the use of spring elements of the Kaden type to limit the length of the individual spring elements to relatively low values such, for example, as the width of the seat or the height of a back in order to permit the use of relatively light spring wire. It has been the general practice heretofore, accordingly, in constructing relatively long spring bodies such as the backs or seats of davenports, mattresses, and the like, to dispose the individual sinuous elements transversely of the back or seat or the mattress. In addition to providing an improved soft edge construction as indicated above, however, the present invention provides a means of interconnecting the individual sinuous elements which permits them to be extended in the direction of the length of a relatively long spring body. These improved interconnecting members are illustrated as applied to the back of a davenport, by way of illustration only, and are further illustrated as constituting lengths of wire extending between the bottom and top of a davenport back and bowed on a desirable arc.

With the above as well as other considerations in view, objects of the present invention are to provide a spring construction employing principal or load-carrying spring elements and employing supplemental spring elements which project beyond the load-carrying elements to provide a soft edge construction; to provide such a construction in which the supplemental spring elements are located immediately adjacent the edge of the construction, one end of each thereof being anchored to suitable frame structure and the other end thereof being suitably connected to the load supporting element; to provide such a structure in which each load carrying spring element is provided with a supplemental spring element disposed in substantial alignment therewith; to provide such construction in which the supplemental spring elements are disposed between adjacent load carrying elements; to provide such a construction in which, in one embodiment, the soft edge end of each load carrying element is anchored to the frame structure at a point spaced inwardly from the associated supplemental spring element and in another embodiment is anchored to the frame structure at a point in alignment with the connection of the supplemental spring element to the frame structure; to provide such a construction in which, alternatively, the supplemental spring elements may take the form of coil springs or may take the form of sinuous springs, or may take the form of jack springs;

and to provide an improved construction of jack spring adapted to have a readily assembled interlocking connection with the cooperating spring elements.

Further objects of the present invention are to provide a seat construction embodying inner and outer frame members resiliently connected together and further embodying a resilient surface for the outer frame members; to provide such a construction in which the outer frame member is pivotally connected to the inner frame member along one edge thereof and is resiliently connected to the inner frame member along an opposite edge thereof.

Further objects of the present invention are to provide a spring structure which may be extended to a substantial length, such as in the case of the back or seat of a davenport or mattress or the like, utilizing relatively short individual sinuous spring elements extending in the direction of the length of the structure, adjacent ends of the individual spring elements being secured together by supporting spring members which extend transversely of the spring body; to provide such a construction in which the supporting spring members may take the form of relatively heavy wire bent to conform to the desired outline of the spring body, and the ends of which are anchored to opposite sides of the spring body; and to provide such a construction in which the principal load located at each supporting member is transmitted thereto through the adjacent sinuous element.

With the above as well as other objects in view, which appear in the following description and in the appended claims, preferred but illustrative embodiments of the present invention are shown in the accompanying drawings, throughout which corresponding reference characters are used to designate corresponding parts, and in which:

Figure 1 is a view in elevation illustrating the invention as embodied in a davenport;

Fig. 2 is a view in vertical transverse section taken along the line 2—2 of Fig. 1;

Fig. 3 is a fragmentary view in top plan taken along the line 3—3 of Fig. 1;

Fig. 4 is a view of the connecting element used in the construction of Figs. 1, 2 and 3;

Fig. 5 is a view of a combined supplemental spring element and connecting element which may be used in the embodiment of Figs. 1, 2 and 3;

Fig. 6 is a view in vertical transverse section of a modified embodiment of the invention;

Fig. 7 is a fragmentary view in top plan taken along the line 7—7 of Fig. 6;

Fig. 8 is a view of the connecting element utilized in the construction of Figs. 6 and 7;

Fig. 9 is a view in central transverse section illustrating the use of jack springs;

Fig. 10 is a fragmentary view taken along the line 10—10 of Fig. 9;

Figs. 11, 12 and 13 are fragmentary views illustrating the method of assembling the jack springs with the sinuous spring elements in the arrangement of Figs. 9 and 10;

Figs. 14 and 15 are views of modified jack spring elements which may be used in the practice of the invention;

Fig. 16 is a view in perspective of a further embodiment of the invention;

Fig. 17 is a view in central transverse section, taken along the line 17—17 of Fig. 16; and Figs. 18 and 19 are fragmentary views in central transverse section of further modifications of the invention.

Considering first the construction of the improved spring back, and referring to Figs. 1 and 2, the back is illustrated as formed in three sections A, B, C, although a larger or smaller number of sections may be used if desired. Each of the sections is composed of a plurality of sinuous type spring elements 10, constructed as disclosed and claimed in the above identified Kaden patent, the individual elements of each section running in the direction of the length of the body. One end of each of the elements of sections A and C is anchored as at 12 to a member such as 14 constituting the end of the frame structure. The other end of each of the spring elements associated with sections A and C, and both ends of the spring elements associated with section B are anchored as by clips 16 to a supporting spring member 18. The upper end of each spring member 18 as clearly appears in Fig. 2, is anchored to the upper edge frame member 20, as by bending it over the back of the frame member and stapling it to the under side thereof as indicated at 22. The lower end of each supporting spring member 18 is turned under the base member 24 of the back frame and may be correspondingly anchored thereto. As will be appreciated, each spring supporting member 18 may be given an initial form determined by the desired outline of the spring construction. Preferably and as illustrated, a plurality of centering springs 26 are provided in each section which extend between adjacent spring elements, and act to limit lateral movement of these elements with respect to each other.

As described in detail in the above identified Kaden patent, each of the spring elements 10 extends between the supports for the opposite ends thereof in bowed form, so that each supporting spring member 18 occupies a depressed or recessed position with reference to the central portion of each spring element 10. This relationship thus produces a desirable tufted relation between the individual sections A, B and C of the back and in addition, permits the sinuous spring elements 10 at either side of each member 18 to receive the weight of an occupant seated immediately adjacent a member 18. Since the weight of an occupant is thus received by the sinuous spring elements rather than by the supporting member 18, the latter may be made somewhat more rigid than the elements 10, in order to provide a firm support for the back. It is, however, preferred to form the members 18 so that they may flex under a load, at least to a certain extent, thus giving additional resiliency and softness to the construction as a whole.

In addition to flexing inwardly and outwardly with reference to the back, the supporting members 18 may also flex longitudinally of the back. Thus, when a load is applied, as for example, in the middle of any section, the individual spring element 10 in addition to flexing in the zig-zag portion thereof in giving under the weight of the load, are permitted to lengthen somewhat by the flexing of the supporting members 18. This feature, for a given gauge of spring elements 10, still further increases the resiliency and softness of the spring structure. The resultant construction is one which may be economically produced, and which may be given any desired degree of resiliency and any of a wide variety of outline configurations.

Considering now the seat construction, and referring particularly to Figs. 2 and 3, the load carrying portion of the seat is formed of a plurality of the sinuous spring elements 40 of the Kaden type, the inner end of each of which is anchored as by a clip 42 to a member 44 constituting the rear edge of the frame, and the forward end of each of which is anchored as by a clip 46 to a member 48 which extends throughout the length of the structure but is disposed in inwardly spaced relation to the front frame member 50. It is noted that the two frame elements 44 and 48 are turned with their major dimensions horizontal, in order to enable them to more effectively resist the spreading stresses to which they are subjected when a load is applied to the spring elements 40.

The soft edge is provided by a plurality of similar coil spring elements 52, the lower ends of each of which is suitably anchored to the frame element 50, and the upper end of each of which is suitably clipped as by an element 54 to a border wire 56 of relatively heavy gauge. Each clip 54 also forms a connection between the associated spring 52 and a spring-wire bracket 58, of generally U-shape form which extends inwardly of the seat and is connected to one of the lateral turns of the associated sinuous spring element 40. In the illustrated construction, the connection between each bracket 58 and each sinuous spring element 40 is effected by inwardly turning the ends 58a of the legs of the bracket, so that they may be clipped over the sinuous element. Preferably and as illustrated in Fig. 3, the border wire 56 extends entirely along the length of the spring construction and the ends thereof are laterally turned along the end of the spring construction as indicated at 60, and again laterally turned inwardly at 62 and secured as by a clip 64 to one of the turns of the associated end sinuous element 40.

The soft edge constituted by the springs 52 and the connecting elements 58 is thus caused, by the border wire 56, to move more or less as a unit. In view of the pivotal connection between the border wire 56 and the connecting elements 58 to the sinuous element 40, this soft edge is permitted to freely move up and down with respect to the main body of the spring structure, subject to the restraining forces of the coil springs 52. As will be appreciated, by properly proportioning the relative strengths of the springs 52 in relation to the strength of the load carrying spring elements 40, any desired relation may be obtained between the softness of the edge and the softness of the load carrying portion of the seat.

In the modified embodiment of Fig. 5, the separate spring elements 52 and connecting elements 58 described above, are replaced by a unitary element designated as a whole as 70, and comprising a continuous length of wire coiled to define a coil spring 72, and a connecting element having the legs 74 and 76, and the attaching portion 78, which may be reversely bent with respect to the legs to constitute an eye to receive a portion of the associated sinuous connecting element 40.

Referring now particularly to Figs. 6, 7 and 8, an embodiment of the invention is shown which distinguishes principally from the previously described embodiment in that first the previously described coil spring soft edge elements 52 are replaced by spring elements of the sinuous type, and second in that, in order to permit the load carrying and soft edge spring element to be anchored to the same frame member, the soft edge elements are disposed in alternate relation to the load carrying elements. In Figs. 6, 7 and 8, the load carrying spring element 80, also of the type described in the above identified Kaden patent are anchored by clips 82 and 84 to the rear and front frame elements 86 and 88, respectively. The soft edge spring elements 90, also of the sinuous type, are anchored at their lower ends to the inner edge of the front frame portion 88 as by the clips 92, and are connected at their upper ends to a border wire 94 corresponding to the previously identified border wire 56. Elements 90 are also secured to generally U-shaped connecting elements 96, as by the clips 98. One leg of each connecting element 96 is connected to a sinuous element 80 at one side of the soft edge spring element 90, and the other leg thereof is connected to a corresponding part of the sinuous load carrying spring element at the opposite side thereof. Preferably and as illustrated, the intermediate portions 96a of the legs of the connecting elements are of reduced spacing, in order to overcome any otherwise existing tendency of the connecting elements 96 to bind upon the load carrying elements 80 when the soft edge portion is depressed. As in the previous instance, any desired relation between the relative softness of the edge and of the load carrying portion may be obtained by suitably proportioning the characteristics of the soft edge spring elements 90 relative to those of the load carrying elements 80. A predetermined degree of surface softness of the soft edge portion may also be obtained by suitably proportioning the resiliency of the connecting elements 96.

Referring particularly to Figs. 9 and 10, the load carrying spring elements 100, also preferably of the type described in the above identified Kaden patent, are anchored by clips 102 and 104 to the front and rear frame elements 106 and 108, respectively. In this arrangement, the soft edge is provided by a plurality of jack springs such as 110, one of which is provided for each sinuous load carrying spring element 100, and is arranged in transverse alignment therewith. The jack springs 110 are preferably of a double type, each including two pairs of resiliently interconnected legs 110a and 110b. The ends of the legs 110b are interconnected by a transverse member 110c which in turn is secured to the outer frame member 108 by a clip 112. The outer ends of the legs 110a are secured to a border wire 114 by clips 116 and are also reversely bent to provide the connecting portions 110d which extend rearwardly of the seat and are connected to an intermediate point along the load carrying elements 100. The border wire 114 extends continuously along the length of the seat, as described in connection with the earlier figures.

A feature of the present construction is the improved interlocking between the inner ends of the legs 110d and the load carrying spring elements 100, which relation is more clearly shown in Figs. 11, 12 and 13. By virtue of this improved interlocking connection, the loops or eyes in the ends of the legs 110d, and which receive the load carrying element 100, may be formed as an incident to the manufacture of the jack springs and are not required to be modified or re-formed in assembly.

Referring particularly to Figs. 11, 12 and 13, the inner end of one of the legs 110d is provided with an eye formed by reversely bending the end thereof to the position shown, in which the portion 110e is spaced from the portion 110f to an extent slightly in excess of the diameter of the wire constituting the load spring 100. An eye is formed in the other leg 110d by reversely bending the end thereof in a similar way, the end portion, however, being somewhat shorter than in the case of the other leg.

To assemble the parts, the first above mentioned leg 110d is sprung slightly to a position in which the portion 110e runs substantially parallel to the portion 100a of the spring 100, in which position the portion 100a may be inserted through the space between the portions 110e and 110f. Thereafter, the leg 110d may be slightly axially rotated in a clockwise direction as viewed in Fig. 11 to bring the portion 100a fully into the eye. With the parts in this relation the extreme end of the portion 110e passes somewhat below and behind the portion 100a, so that such portion is completely surrounded by the eye, and can be released therefrom only by reversing the just stated assembly sequence. The parts are shown in the just stated relation in Fig. 12.

As a final step, the remaining leg 110d may be slightly sprung to rotate the eye formed therein to the position shown, in which the portion 100a may be inserted into the eye, the spacing between the extreme end 110g and the portion 110h being sufficient to permit this. Thereafter, the remaining leg 110d may be returned to its normal position, bringing the parts to the completely assembled position shown in Fig. 13.

In the foregoing arrangement it will be observed that the jack springs 110 combine the functions of the coil spring 52 and the brackets 58 of Fig. 2 and of the sinuous spring elements 90 and connecting brackets 96 of Fig. 6.

The jack spring 120 shown in Fig. 14 duplicates the construction described above in all respects except that the inner ends of the legs 120d are provided with conventional reversely bent portions 120e, into which the wire of the load carrying element may be readily fitted. After such assembly if desired, the eyes may be closed by further bending the portions 120e.

In the arrangement shown in Fig. 15 the jack springs 130 are provided with eyelets 130a, through which the previously mentioned border wire 114 may be passed, thus dispensing with the use of the previously mentioned connecting clips 116.

Referring particularly to Figs. 16 and 17 an embodiment of the invention is shown which distinguishes primarily from the previously described embodiments in that the upper and lower frame portions of the seat are resiliently connected together. In this embodiment, the upper and generally rectangular frame portion 140 is provided at its rear or inner edge with one or more downwardly extending brackets 142, which may conveniently be formed of pressed metal, and which are pivotally connected by pins 144 to upstanding corresponding brackets 146, which are carried by the lower and also generally rectangular frame portion 148.

The degree of pivotal movement of the upper and lower frame portions 140 and 148 relative to each other is controlled in the present instance by a series of jack springs 150 which may take the form described with reference to any of Figs. 10, 14 or 15. One leg of each jack spring 150 is secured to the lower frame portion 148 at the outer edge thereof by a clip 152, and the other leg thereof is similarly secured to the outer edge of the upper frame portion 140.

As also illustrated in Figs. 16 and 17, the upper frame portion is provided with a resilient or spring-like surface, constructed and arranged as described with reference to Figs. 9 and 10, as is indicated by the use of corresponding reference characters. Preferably also one or more transverse supporting struts 154 are connected between the inner and outer edges of the upper frame portion 140, to give lateral support therefor.

With the just described construction it will be appreciated that the previously disclosed soft edge is embodied in the resilient upper surface of the upper frame portion and in addition, the further resiliency of the seat is provided by permitting a predetermined degree of springing movement between the upper and lower frame portions. By properly proportioning the relative resiliency of the various spring elements, an extremely effective seat construction is provided.

The embodiments of Figs. 18 and 19 illustrate alternative manners of providing the soft edge for the resilient upper surface of the upper frame portion 140. In Fig. 18 the soft edge is provided by a sponge rubber or equivalent element 160 which preferably extends throughout the length of the seat, and over-lies the load elements 100. The inner edge of the member 160 is shown as pivotally connected to the load elements 100 as by a clip 162. If desired and as illustrated, the remaining portions of the member 160 may freely seat upon the load elements 100.

In the arrangement of Fig. 19 a soft edge is provided by a fabricated pad 164, which also preferably extends throughout the length of the seat, and is secured at its inner edge to the load elements 100 as by the clips 166.

Although specific embodiments of the invention have been described in detail, it will be appreciated that various modifications in the form, number and arrangement of the parts thereof may be made within the spirit and scope thereof.

What is claimed is:

1. A seat construction including a frame structure having oppositely disposed spaced sides and an intermediate element, a plurality of resilient spring elements spanning one of said sides and said intermediate element and connected thereto, additional spring elements connected to the other of said sides and to said first mentioned strips and forming a soft edge for said seat, and a border wire connected to said additional spring elements for maintaining them in unit relation.

2. A seat construction including a frame structure having first and second oppositely disposed spaced side portions disposed in different horizontal planes and a third supporting portion intermediate said first and second portions and above said first portion, a plurality of resilient spring strips spanning said second and third portions and having their ends connected thereto respectively, and a plurality of additional spring elements for providing a soft edge for said seat, said additional elements having one end thereof connected to said first portion and having the other end thereof connected to said first mentioned spring elements.

3. A seat construction including a frame structure having first and second oppositely disposed spaced side portions disposed at different levels and a third supporting portion intermediate said first and second portions and disposed above said first portion, a plurality of resilient spring strips spanning said second and third portions and having their ends connected thereto respectively, an additional spring element individual to each of said first mentioned elements for providing a soft edge to said seat, said additional element having one end thereof connected to said first portion and the other end thereof connected to the associated first mentioned element.

4. A seat construction including a frame structure having first and second oppositely disposed spaced side portions and a third supporting portion intermediate said first and second portions, said first portion being disposed below said intermediate portion, a plurality of resilient spring strips spanning said second and third portions and having their ends connected thereto respectively, a plurality of additional spring elements supported on said first mentioned portion and projecting above said intermediate portion for providing a soft edge for said seat, and means connecting said additional springs to the first mentioned spring strips.

5. A seat construction including a frame structure having first and second oppositely disposed spaced side portions and a third supporting portion intermediate said first and second portions, a plurality of resilient spring strips spanning said second and third portions and having their ends connected thereto respectively, and a plurality of coil springs individual respectively to said spring strips for providing a soft edge for said seat, means connecting one end of each of said additional spring elements to said first portion, means including a bracket for connecting the other end thereof to the associated spring strips, and a border wire connected to said coil springs for retaining them in unit relation.

6. A seat construction including a frame structure having oppositely disposed spaced sides, a plurality of resilient spring elements connected across said sides and disposed thereabove, and a plurality of coil springs having their axes vertically disposed for forming a soft edge for said seat, each of said coil springs including a spring portion having one end connected to one of said sides and projected thereabove and above adjacent ends of said first spring elements, and means connecting said second spring elements to said first spring elements.

7. A seat construction including a frame structure having oppositely disposed spaced sides, a plurality of resilient spring elements spanning said sides and connected thereto, and means for forming a soft edge construction for said seat comprising a plurality of coil springs having their axes vertically disposed, means connecting one end of each coil spring to said frame adjacent one of said sides, and means connecting the other ends of said coil springs to said resilient spring elements.

ANDREW MOUW.
HENRY HOPKES.